Fig. 1.

W. A. SKINNER & T. F. CAIN.
AIR BRAKE APPLIANCE.
APPLICATION FILED OCT. 23, 1908.

1,045,448.

Patented Nov. 26, 1912.

Inventors
W. A. Skinner
T. F. Cain

W. A. SKINNER & T. F. CAIN.
AIR BRAKE APPLIANCE.
APPLICATION FILED OCT. 23, 1908.

1,045,448.

Patented Nov. 26, 1912.

Witnesses

Inventors
W. A. Skinner.
T. F. Cain.
By
Attorneys

UNITED STATES PATENT OFFICE.

WALTER A. SKINNER, OF MOBERLY, AND THOMAS F. CAIN, OF MONTGOMERY CITY, MISSOURI.

AIR-BRAKE APPLIANCE.

1,045,448.  Specification of Letters Patent.  Patented Nov. 26, 1912.

Application filed October 23, 1908. Serial No. 459,229.

*To all whom it may concern:*

Be it known that we, WALTER A. SKINNER and THOMAS F. CAIN, citizens of the United States, residing at Moberly, Randolph county, and Montgomery City, Montgomery county, respectively, State of Missouri, have invented certain new and useful Improvements in Air-Brake Appliances, of which the following is a specification.

This invention comprehends certain new and useful improvements in air brake systems, and relates particularly to an improved safety appliance in the form of an air valve attachment which may be used either as a separate adjunct or cast integral with either the ordinary or quick-action triple valve.

One of the objects of the invention is an air brake appliance of this character, so constructed and arranged that there may be automatic and straight air on all the cars of the train, with but one train line.

The invention also has for its object a device of this character, by the use of which the auxiliary reservoirs on cars can be recharged after a brake application, without releasing the brakes, whereby, the instant the brakes are released, the auxiliary reservoir has standard pressure for full service or emergency application, and whereby the brake cylinders can be kept charged to a standard pressure of say 50 lbs. with a train standing on a down grade, and the auxiliary reservoirs charged to a standard pressure of say 70 lbs. or any train line pressure carried, so long as the air is pumped from the engine. And a further object of the invention is a safety appliance in an air brake system, so constructed and arranged that, if a train equipped with the invention were to get away on a heavy grade before the auxiliary reservoirs were charged, all brake cylinders of the cars could be charged with straight air, thereby charging the auxiliary reservoirs and the brake cylinders at the same time.

With this and other objects in view as will more fully appear as the description proceeds, the invention consists in certain constructions, arrangements and combinations of the parts that we shall hereinafter fully describe and claim.

For a full understanding of the invention and the merits thereof, and to acquire a knowledge of the details of construction, reference is to be had to the following description and accompanying drawings, in which:

Corresponding and like parts are referred to in the following description and indicated in all the views of the drawings by the same reference characters.

Referring to the drawings wherein the invention is illustrated as separate from the triple valve, A designates a triple valve, B a brake cylinder, C an auxiliary reservoir, D a train pipe line and E our improved safety appliance. This latter is connected to the exhaust port of the triple valve A by a pipe $a$, to the brake cylinder B by a pipe $b$, to the auxiliary reservoir C by a pipe $c$ and to the train line D by a branch pipe $d$.

Figure 1:
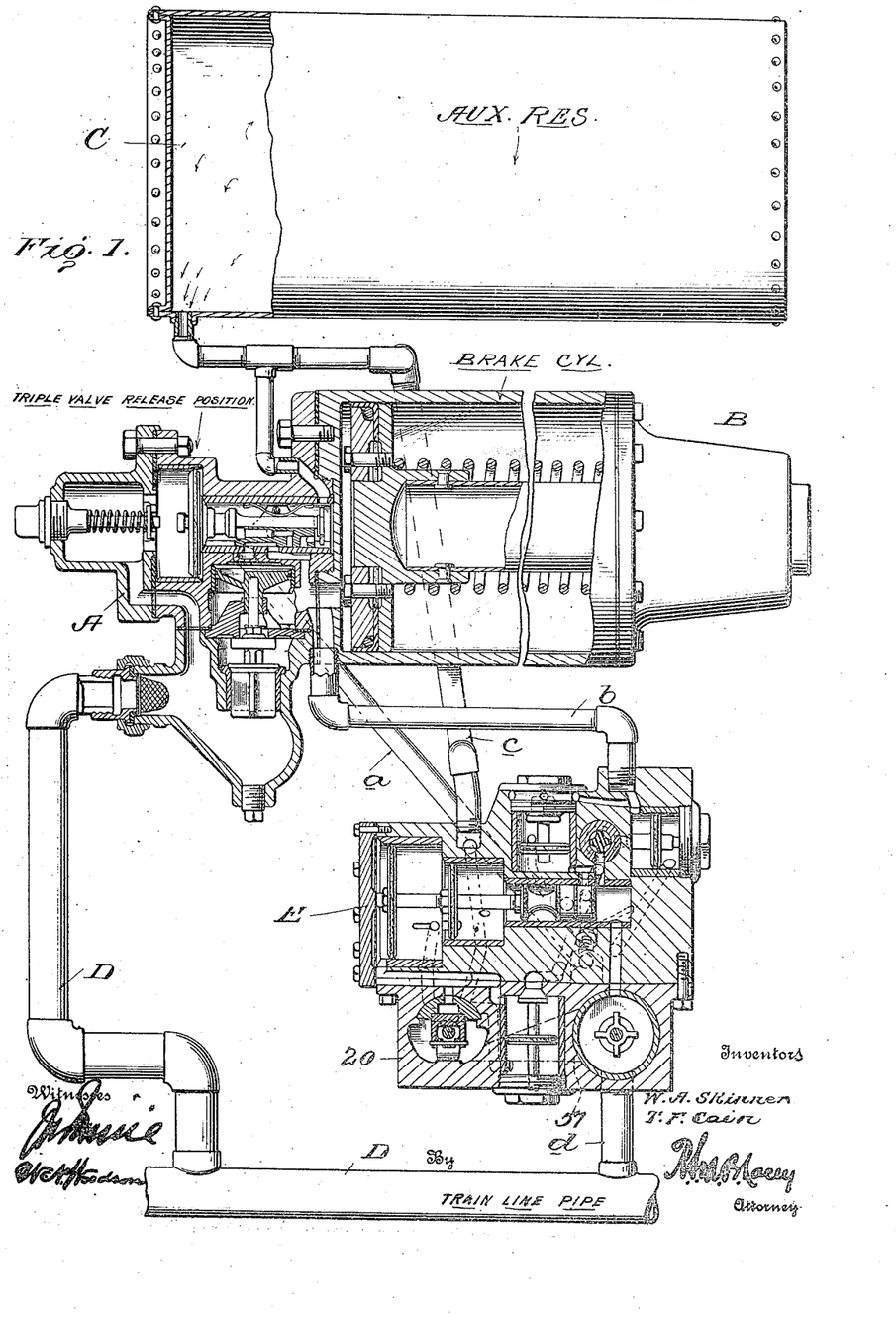
Figure 1 is a plan view of the brake mechanism of a car equipped with the improvements of our invention, parts being shown in section and other parts broken away.
Figure 2:
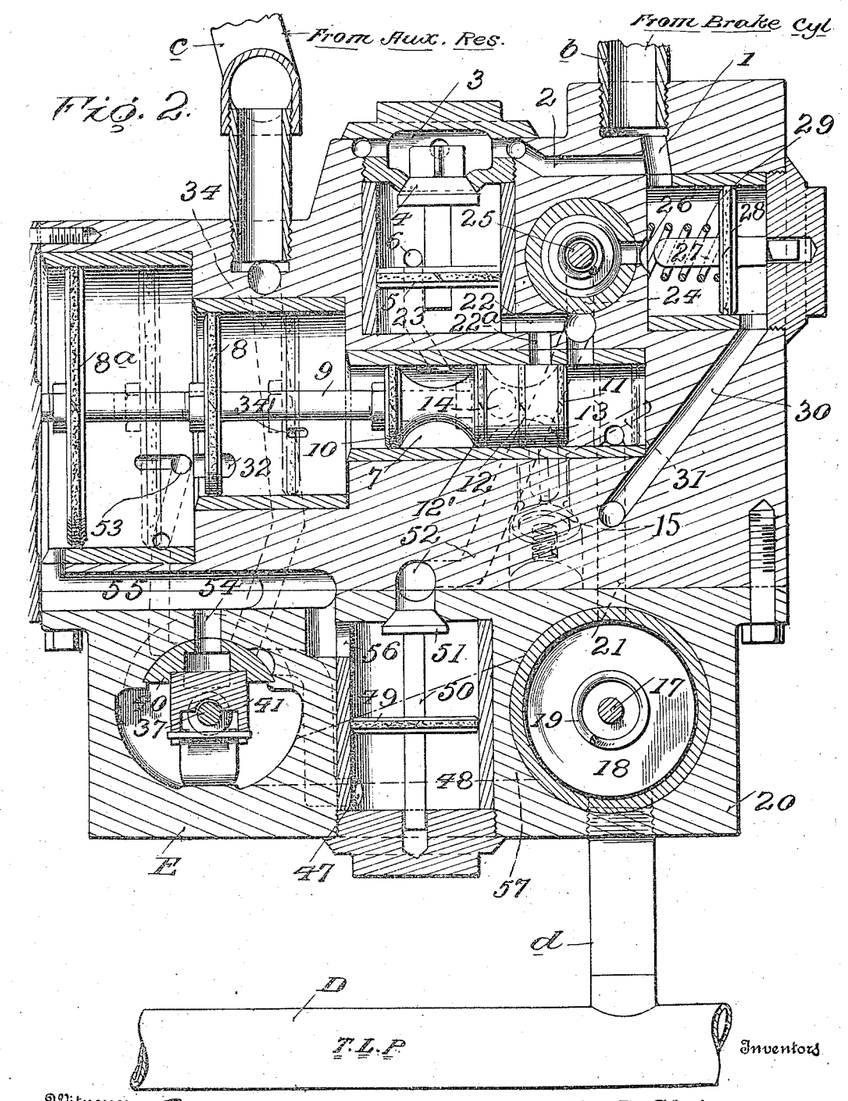
Fig. 2 is a horizontal sectional view of our improved air brake appliance, on an enlarged scale taken on an irregular line extending through the brake cylinder connection and dipping to show the main piston valve.
Figure 3:
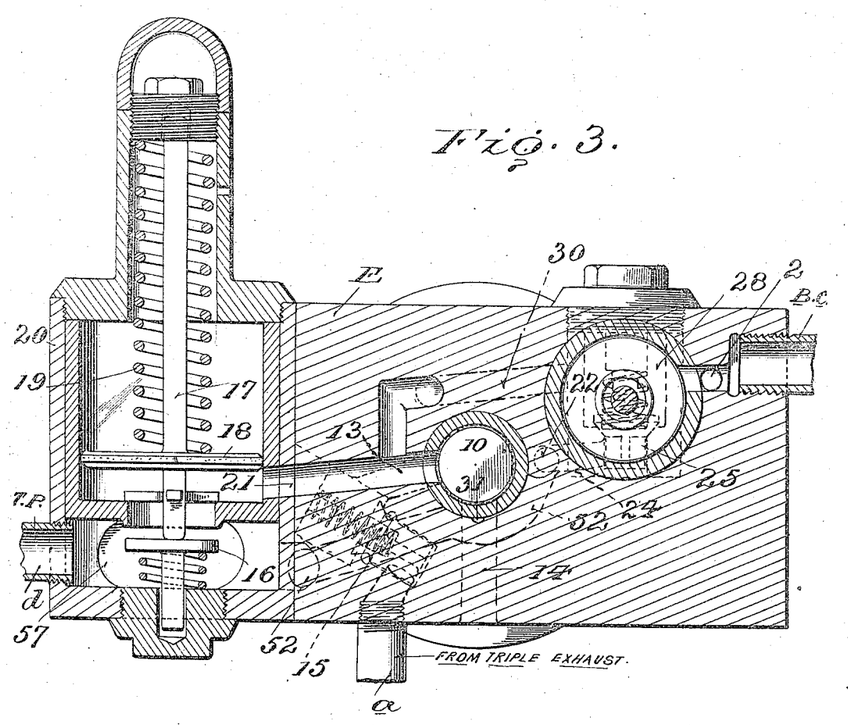
Fig. 3 is a transverse sectional view thereof, the section being taken on a plane where the connections of the appliance with the brake cylinder and train pipe are shown.
Figure 16:
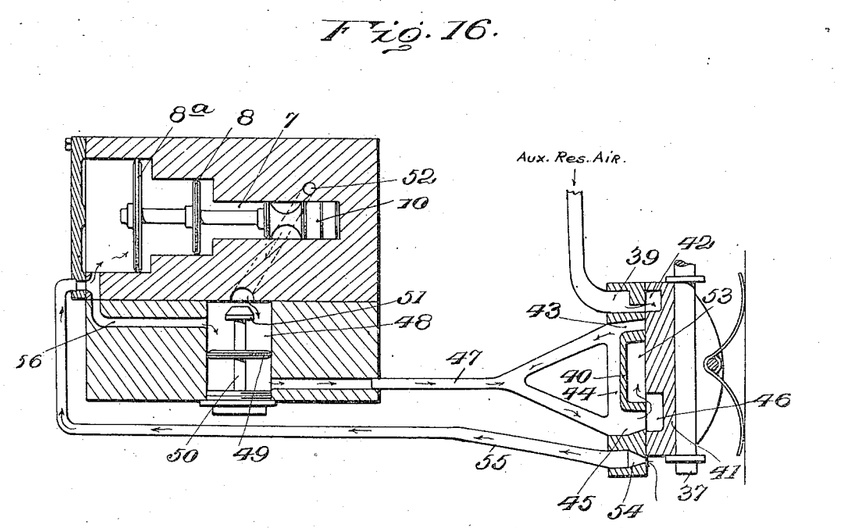
Figs. 16 and 17 are diagrammatic sectional views showing the operation of the governor slide valve.

In describing the invention, as the parts are arranged in Fig. 1, and most of the parts are also arranged in Fig. 2, it will be assumed that a service application has been made and the engineer's brake valve is on the "lap" position, that it is desired to recharge the auxiliary reservoirs of the different cars of the train without releasing the brakes, and that it is then desired to release the brakes. Referring now more particularly to Fig. 2, the brake cylinder air enters the casing E through the port 1 and thence passes through the passage 2 into a hollow cap-nut 3, where the air acts upon a winged valve 4 to force it off its seat on said nut, the said valve being secured on the same rod as a piston 5 working in a bushing, as shown. The said air from the brake cylinder, passes the valve 4, flows through the passage 6, around the piston 5 and its bushing, and into the valve chamber 7, where it acts upon a piston 8 which is at this time in the position illustrated in dotted lines in said Fig. 2, and in full lines in Fig. 16 thereby forcing said piston to the left. The piston 8 is secured to a piston rod or valve stem 9 to which the piston valve 10 is rigidly connected, so that as the brake cylinder air moves the piston 8 to the left, the said piston carries the valve 10 with it, and the packing rings 11 and 12 of said valve overlap the port 13 which leads from the triple exhaust port and pipe $a$, thereby preventing the air from flowing through the exhaust port of the triple valve to the atmosphere, even with the triple valve in the release position as illustrated in Fig. 1. It is to be noted, as best seen in Figs. 2 and 3, that these packing rings 11 and 12, when they overlap the port 13, separate said port from the passage 14 which is the final exhaust and which leads to the atmosphere through the side of the casing E, as indicated in dotted lines in Fig. 3. Thus it will be seen that the auxiliary reservoi C can be charged through the ordinary feed groove in the slide valve piston of the triple valve while the engineer's brake valve is in the running position, without releasing the brakes, the exhaust air from the triple being prevented from reaching the atmosphere by being stopped at the port 13, and prevented from flowing out through the port and passage 14.

The main valve of the safety appliance (designated 10) is now in working position, as illustrated in full lines in Fig. 2. 15 designates a check valve which is in the passage leading from the triple valve exhaust port to the port 13, as indicated in dotted lines in Figs. 2 and 3, and which permits the air to pass said valve in a direction from the triple exhaust, but which prevents the train pipe air from flowing into the brake cylinder through the exhaust cavity in the triple slide valve when the engineer's brake valve is put in running position and the triple forced to the release position.

It will be observed, by particular reference to Fig. 2, that when the main valve 10 of our appliance has moved to the working position illustrated in full lines in such view, the valve 10 will overlap the passage 6, thereby shutting off communication between such passage and the chamber to the right of the piston 8. As the train pipe air is fed into the auxiliary reservoir C through the feed groove in the triple valve piston, it is also flowing through the pipe $d$ past a valve 16 (Fig. 3) which is held off its seat by a piston rod 17, and held under say 50 lbs. tension by a spring 19 encircling the rod 17 and bearing upon the piston 18 mounted in one of the cavities or bushings of the governor casing 20. The train pipe air thus flows past the valve 16, through a passage 21, into the valve chamber 7, back of the main piston valve 10 of our appliance, and also flows from said chamber and through a cross passage 22 into the chamber 23 in which the piston 5 works, thereby immediately forcing the piston 5 back and seating the valve 4 so as to effectually cut off or prevent any more air from flowing from the brake cylinder. The train pipe air also flows through a passage 24 underneath a check valve 25, to a valve seat 26, where it is stopped by a valve 27 secured to a piston 28 and encircled by a spring 29 having a tendency to force the valve off its seat. This valve is, however, held on its seat by the train line air passing through the passage 30 to the side of the piston remote from the spring, as shown in Fig. 2, until the air pressure on opposite sides of the piston 28 balances, whereupon the spring 29 will act to open the valve 27 and permit straight air to be fed into the brake cylinder. It will thus be seen that by our invention there can be automatic and straight air on all of the cars with but a single train line, and that if, for example, a train was to get away on a heavy grade before the auxiliaries had been charged to standard pressure, all of the brake cylinders of the cars could be fed with straight air, thereby charging the reservoirs and the brake cylinders at the same time.

As will be best seen in Fig. 2, the short port 22$^a$ that connects with the port 22, has train pipe pressure in it when the valve 10 is in the full line position shown in Fig. 2. There is a packing ring on each side of this port in this position, and the exhaust pipe from the triple valve is positioned between these packing rings. The triple valve slide valve being in the release position, said slide valve overlaps the exhaust port of the cylinder and the exhaust port leads in between said packing rings so that air can flow from the triple valve exhaust only when the main valve 10 is in the release position. Train pipe air is cut off and can not get into the ports 22 and 22ª when the main valve 10 is in the release position indicated by dotted lines in Fig. 2. In further explanation of the port 22ª, it may be stated that in the release position of the main piston valve 10, shown in dotted lines in Fig. 2, the exhaust cavity in the valve 10 will overlap the port 22ª as well as the ports 13 and 14 leading from the brake cylinder to the atmosphere. This is to prevent the exhaust of the brake cylinder pressure from below the piston 5, so that said piston will hold the valve 4 on its seat in order that the brake cylinder air may not raise the valve 4 from its seat and move the main valve 8 and piston valve 10 to the left, that is, to the working position. If there were no pressure below the piston 5, the brake cylinder air above the valve 4 would flow out and thereby place the main valve 10 again in working position.

Figures 12, 13:
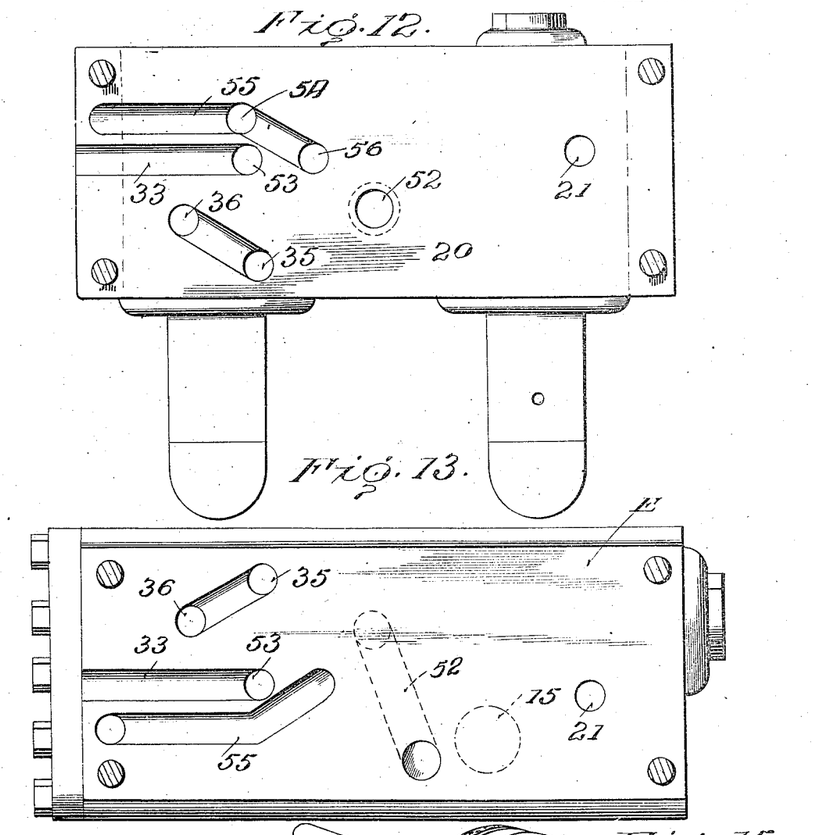
Fig. 12 is a face view of the governor mechanism inverted to show the relative arrangement of grooves and ports that correspond with similar grooves and ports in the adjoining face of the main casing of the appliance.
Fig. 13 is a view of such face, it being understood that Figs. 12 and 13 would match if one were to be placed upon the other with Fig. 12 turned down upon Fig. 13.
Figures 14, 15:
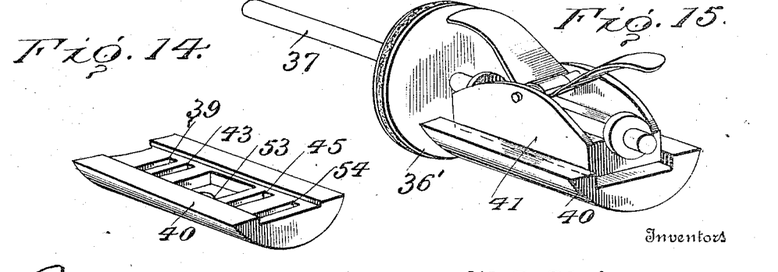
Fig. 14 is a detail perspective view of the seat for the slide valve of the governor mechanism.
Fig. 15 is a detail perspective view of said slide valve on its seat, together with its piston and piston rod.

32 designates a passage around the piston 8, said passage connecting through the port 53 with the passage 33 leading to the atmosphere at one end of the casing E, this passage being formed by two grooves formed in the opposing faces of the main casing of the appliance and the casing 20 of the governor mechanism, as best seen in Figs. 12 and 13. In the position of the parts when the triple exhaust is cut off and the brake cylinder fed with straight air, it will be noted that the cavity in the main piston valve 10 overlaps the passage 6 leading into the valve chamber 7, and if train pipe air should be drawn off to such a low pressure that the brake cylinder air would force the valve 4 from its seat, it is obvious that the brake cylinder air could not escape to the atmosphere through the port and passages 32, 53 and 33 around the piston 8. When the main valve 10 is moved to the release position shown in dotted lines in Fig. 2, as hereinafter more fully described, it is clear that the packing ring 12′ will uncover the port 14 and let what air pressure might have been over the piston 5 out to the atmosphere through the passage 6 and passage 14 before it uncovers the port 13 to connect the triple valve exhaust port to the atmosphere. Furthermore, when this main valve 10 is in the release position, the air passes from the valve side of the piston 5, through the passage 6, and around the piston 8 by way of the by-pass groove 34′ overlapping the packing ring of the piston 8, and to the atmosphere through the ports 53 and 33.

We have thus far described how, after a service application of the brakes has been made and it is desired to recharge the auxiliary reservoir, the piston 10 is moved to working position from the release position which takes place at the time of the brake application, the recharging of the auxiliary reservoir being accomplished by moving the engineer's brake valve to the running position, there being no change in the position of the parts of our appliance during this recharging operation, it being of course understood that the placing of the engineer's brake valve in running position forces the triple valve to the release position, which is the position for recharging the auxiliary reservoir. There is, then, no change in the position of the parts of our apparatus during this recharging operation, but when the engineer's brake valve is placed in full release position, our appliance also moves to full release position.

Figure 4:
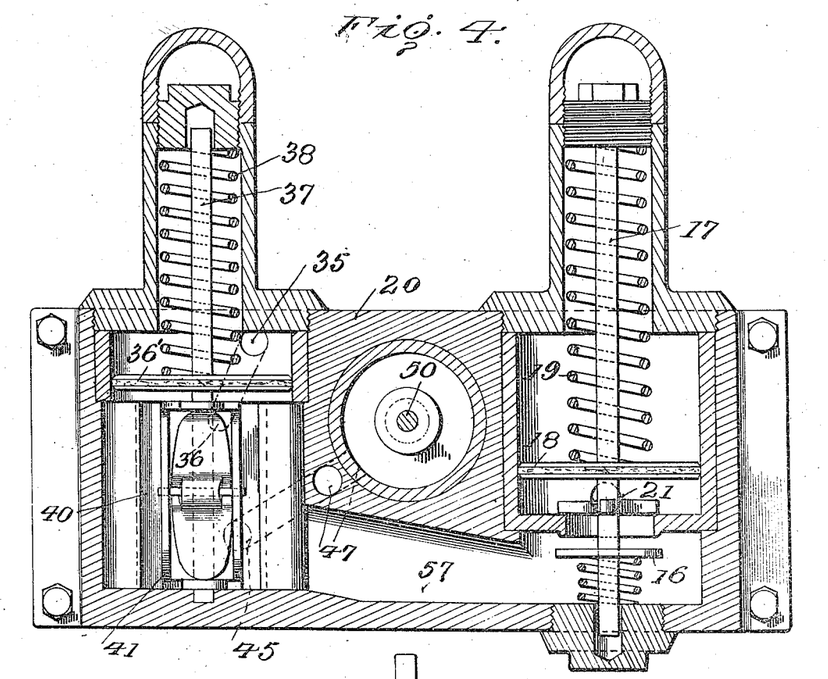
Fig. 4 is a vertical longitudinal sectional view through the governor mechanism of the appliance.
Figure 5:
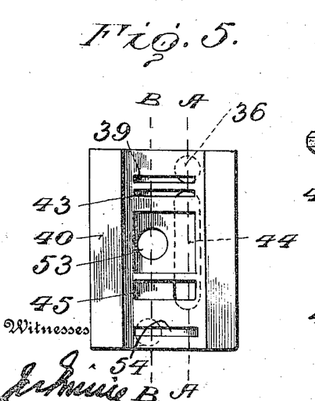
Fig. 5 is a detail plan view of the seat for the slide valve of the governor mechanism.
Figures 6, 7:
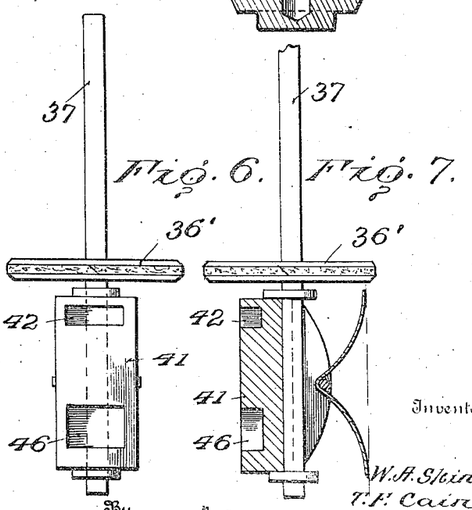
Figs. 6 and 7 are, respectively, a top plan and longitudinal section of said slide valve, its piston and piston rod being shown in side elevation.
Figures 8, 9, 10, 11:
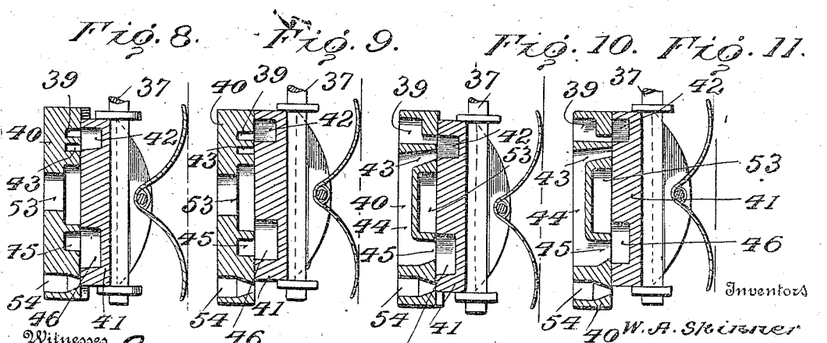
Figs. 8, 9, 10 and 11 are detail sectional views illustrating the correlated positions of the slide valve and its seat for different operations of the appliance, Figs. 8 and 9 being sections taken substantially on the line B—B of Fig. 5, as regards the valve seat, and Figs. 10 and 11 being sections taken substantially on the line A—A of Fig. 5.
Figure 17:
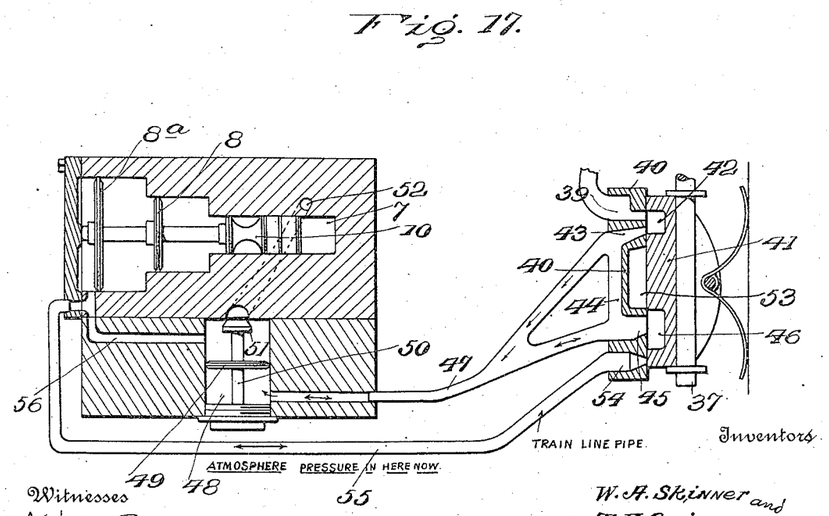
Figure 18:
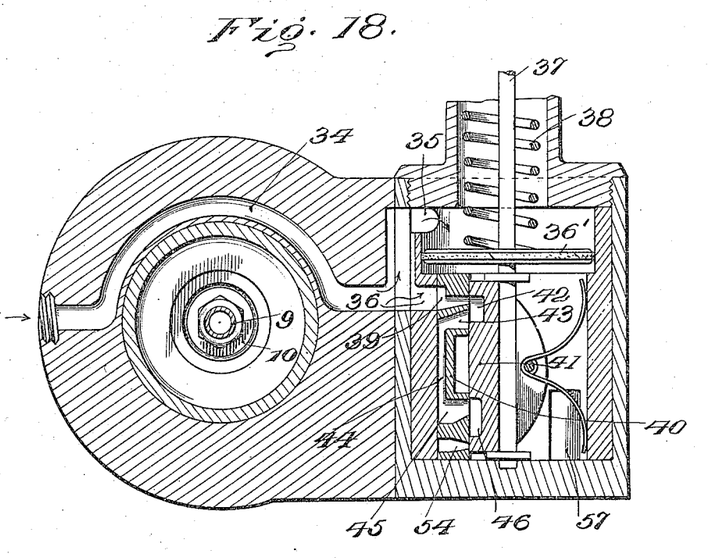
Fig. 18 is a section taken transversely of Fig. 2 and centrally through the governor slide valve.

We shall now describe how the main valve 10 of our appliance is moved to a position to release the brakes; that is to say, to a position where the cavity in the piston valve 10 overlaps the ports 13 and 14 so as to allow the brake cylinder air from the triple valve exhaust port to escape to the atmosphere through the said ports 13 and 14. Auxiliary reservoir pressure connects with the passage 34 extending entirely through the valve casing E, as indicated in dotted lines in Figs. 1 and 2 and shown most clearly in Fig. 18, and connects with a port 35 leading by a diagonal passage, as indicated in Figs. 12 and 13, to a port 36 in the governor casing 20. The port 35 also opens into the governor casing above the piston 36′, said piston being connected to a rod 37 encircled by a spring 38 which has say about 5 lbs. tension. The port 36 is connected to a port 39 in a valve seat 40, and 41 designates the governor slide valve which is rigidly connected to the piston rod 37 by collars or the like as shown. The slide valve 41 is formed with a cavity 42 which, in the working of the piston valve 10, overlaps the port 39 and a port 43, as best seen in Figs. 8, 10 and 17, the port 43 being connected by a passage 44 back of the valve seat with a port 45. This port 45 is designed to register with another cavity 46 formed in the valve 41, and is connected by means of a passage 47 with a piston chamber 48 at a point below the piston 49 therein. This piston 49 is connected to a piston rod 50 to which a valve 51 is also connected, said valve 51 normally closing a passage 52 which leads from the train line passage 24 at the juncture of the same with the cross passage 22 (see Fig. 2). 54 designates a port in the valve seat 40 leading to a passage 55, the latter in turn leading to the left side of a piston 8ª connected to the piston rod 9 in spaced relation to the piston 8. A passage 56 connects the valve side of the piston 49 with the passage 55. A train line passage 57 leads from the pipe d below the valve 16 longitudinally to the top of the governor slide valve 41, as best seen in Fig. 4. 31 designates a vent passage which extends from the rear end of the valve chamber 7 to and communicates with the passage leading from the port 13 so as to allow any train pipe air that might leak past the piston valve 10 (packing ring 11) to escape to the atmosphere through the passage 14 and not force the piston valve 10 to the working position by acting upon the rear face of said piston valve in the chamber 7. It is to be understood that the port 31 serves no purpose except when the main valve piston 10 is in the release position.

When it is desired to place the valve 10 in the release position, the engineer's brake valve is placed in full release position which causes the pressure to rise 20 or 30 lbs. (depending upon whatever main reservoir pressure is carried). This pressure is then on top of the valve 41 and under the piston 36' (Fig. 4) and causes the piston 36' to move away from the greater pressure under it, carrying the slide valve 41 with it, which allows train line air to pass through the port 54 (see Figs. 2, 9, 11 and 16) in the slide valve seat, the air passing to the front of the piston 8ª by means of the passage 55, and also exhausting the auxiliary reservoir pressure from under the piston 49 and at the same time porting train line air on top of piston 49 which causes said piston to move down, carrying with it the valve 51. There is, then, a direct communication from the passage 22 through the passage 52 and through the port 56 and passage 55 to the front face of the piston 8ª, and the pressure on such piston will then force the valve 10 to the right or release position, the air which is then trapped at the right end of the valve chamber passing through the passages 22, 52, and 55 so that it will not act against the valve to prevent its movement. After the piston 36' has made one upward stroke as just described, it will return to the position shown in Fig. 4 as soon as the brake valve on the engine is placed in running position, when the air pressure will charge slowly to 70 lbs. or to whatever normal pressure the brake valve is set to carry. Manifestly, the valve 41 is connected to the piston 36' and makes whatever movements the piston makes. The train line air under the piston 36' will soon equalize with the auxiliary reservoir pressure on top of said piston and the piston will then move down in its cylinder as there is an excess pressure exerted by the spring 38 on the top of said piston. It is understood that the auxiliary reservoir pressure on top of the piston 36' is ported from the auxiliary reservoir where it comes through the triple valve. The slide valve 41 will always be returned to the position shown in Figs. 4, 17 and 18 as soon as the brake valve on the engine is returned to running position and the auxiliary reservoir equalizes with the train pipe pressure. When the valve 10 thus moves to the right or release position, it shuts off the train line air from the passage 52 and underneath the disk valve 51, also shutting the train line pressure off from the left hand face of the larger piston 8ª. When the slide valve 41 returns to the position just named, it ports auxiliary reservoir air under the piston 49 which will thereupon seat the valve 51. There is always auxiliary reservoir air under the piston 49 when the slide valve 41 is in the position shown in Figs. 4, 17 and 18 and until the slide valve 41 has made an upward movement, which will exhaust the auxiliary reservoir air from below the piston 49. It is also understood that when the engineer's brake valve is placed in full release position, the valve 16 is closed, whereby there will be more air pressure underneath the piston 36' than there is auxiliary air pressure above it. This sudden increase of air pressure under the piston 36' will cause it to rise so as to open the port 54, before the auxiliary reservoir air can balance on the top of the piston 36'.

Referring again to Fig. 2, air is removed from the left side of the piston 8ª after it has forced the piston valve 10 to the release position, through the small groove around the piston 8ª when it is in the release position, which connects with the port 53 leading to the passage 33 and to the atmosphere. When the piston valve 10 is in the release position, it cuts off the train line air through the different ports and passages leading to the right of the piston 8ª.

Having thus described the invention, what we claim is:

1. In an air brake system, the combination with an auxiliary reservoir, a brake cylinder, a train pipe, and a triple valve arranged to control the passage of air from the auxiliary reservoir to the brake cylinder and from the brake cylinder to the atmosphere and from the train pipe to the auxiliary reservoir, of means for automatically preventing the escape of the triple exhaust with the triple in release position and for simultaneously feeding straight air from the train pipe into the brake cylinder.

2. The combination with an auxiliary reservoir, a brake cylinder and a triple valve arranged to control the passage of air from the auxiliary reservoir to the brake cylinder and from the brake cylinder to the atmosphere, of a safety appliance embodying a casing having a port connection with the triple exhaust port and having another port leading to the atmosphere, a piston valve mounted in said casing and arranged in one position to separate said ports, whereby to prevent the escape of the exhaust from the triple valve, and means controlled by the air brake pressure for automatically moving said piston valve to such position with the triple valve slide valve in application position.

3. In an air brake system, the combination with a reservoir, a brake cylinder and a triple valve arranged to control the passage of air from the reservoir to the brake cylinder and from the brake cylinder to the atmosphere, of a safety appliance embodying a casing having a port connecting with the triple valve exhaust port and a port leading to the atmosphere, a valve in said casing arranged in one position to separate said ports, whereby to prevent the escape of the triple valve exhaust, a piston connected to said valve and moving the same to such position, the said casing being provided with passages leading from the brake cylinder to a point back of said piston, a valve controlling said passages and arranged to be opened by the brake cylinder air and closed by the train line pressure.

4. In an air brake system, the combination with a reservoir, a brake cylinder and a triple valve arranged to control the passage of air from the reservoir to the brake cylinder and from the brake cylinder to the atmosphere, of a safety appliance embodying a casing having a connection with the exhaust port of the triple valve and having another port leading to the atmosphere, a piston valve mounted in said casing and arranged in one position to separate said ports, whereby to prevent the escape of the triple exhaust, a piston connected to said valve, the said casing being provided with passages leading to the back of the piston from the brake cylinder, a valve controlling said passages, a piston connected to said valve, and a train line having connection with that side of said last named piston which would tend to close the last named valve, the said valve which is arranged to separate said ports before mentioned being provided with a cavity arranged to overlap one end of the passage leading from the brake cylinder to the piston of said valve in the working position of the same.

5. In an air brake system, the combination with a reservoir, a brake cylinder and a triple valve arranged to control the passage of air from the reservoir to the brake cylinder and from the brake cylinder to the atmosphere, of a safety appliance embodying a casing having a port connection with the exhaust port of the triple valve, and another port leading to the atmosphere, a piston valve arranged in one position to separate said ports, whereby to prevent the escape of the triple exhaust, and a piston connected to said valve, the said casing being provided with passages leading to the rear side of said piston from the brake cylinder, whereby brake cylinder air may force the piston in a direction to carry the valve to working position, the casing being also provided with a passage leading to the atmosphere around said piston.

6. In an air brake system, the combination with a reservoir, a brake cylinder and a triple valve arranged to control the passage of air from the reservoir to the brake cylinder and from the brake cylinder to the atmosphere, of a safety appliance embodying a casing having a port connection with the exhaust port in the triple valve and another port leading to the atmosphere, means actuated by brake cylinder pressure for separating said ports in the release position of the triple valve slide valve for the purpose specified, and a check valve in the passage leading from the triple valve exhaust port to the safety appliance, said check valve opening away from the triple valve exhaust port.

7. In an air brake system, the combination with an auxiliary reservoir, a brake cylinder, a train pipe, and a triple valve arranged to control the passage of air from the auxiliary reservoir to the brake cylinder and from the brake cylinder to the atmosphere, and from the train pipe to the auxiliary reservoir, of means for automatically preventing the escape of the triple exhaust with the triple in release position, and for feeding straight air from the train pipe into the brake cylinder.

8. In an air brake system, the combination with a reservoir, a brake cylinder, a triple valve arranged to control the passage of air from the reservoir to the brake cylinder and from the brake cylinder to the atmosphere, and a train line arranged to feed air to the reservoir through the triple valve, in the release position of the latter, of means for holding the exhaust from escaping from the brake cylinder through the triple valve, in the release position of the latter, means for feeding straight air to the brake cylinder with said holding means in the working position, a governor valve, and means for moving said governor valve into a position where the train line pressure will move said holding means to the release position.

9. In an air brake system, the combination with a reservoir, a brake cylinder, a triple valve arranged to control the passage of air from the reservoir to the brake cylinder and from the brake cylinder to the atmosphere, and a train line arranged to feed air through the triple valve to the reservoir, of a safety appliance embodying a casing having a port connection with the triple valve and another exhaust port of the triple valve and another port leading to the atmosphere, a piston valve arranged in working position to separate said ports, a piston secured to said valve, the casing being provided with passages leading from the brake cylinder to the piston, whereby the brake cylinder pressure may move the valve to working position, a governor valve, the casing being provided with passages leading from the auxiliary reservoir to the atmosphere and controlled by said governor valve and also with passages leading from the train line to said valve, the valve being arranged in one position to admit train line air to a piston of the first named valve, whereby to move such valve to the release position, and means for automatically moving said governor valve to such position.

10. In an air brake system, the combination with a reservoir, a brake cylinder, a triple valve arranged to control the passage of air from the reservoir to the brake cylinder and from the brake cylinder to the atmosphere and a train line designed to feed air into the reservoir through the triple valve, of a safety appliance having a port connection with the exhaust port of the triple and another port leading to the atmosphere, a main valve in said safety appliance arranged in working position to separate said ports for the purpose specified and arranged in the release position to connect said ports, means for automatically moving said valve to the working position, a piston 49 in said safety appliance, the appliance being provided with an air passage leading from the train line to a point in front of said valve, the valve being provided with a piston designed to be actuated by train line pressure so as to move the said valve to the release position, a valve controlling said passage and connected to said piston 49, the appliance being also provided with passages leading from the reservoir below the piston 49, a governor valve arranged to control the passage of reservoir air through the reservoir below said piston 49 and between the piston 49 and main valve, and means for automatically moving such governor valve to the position where it will exhaust the reservoir pressure to the atmosphere and admit train line air to the front side of the piston which is connected to the first named valve.

11. In an air brake system, the combination with a reservoir, a brake cylinder, a triple valve arranged to control the passage of air from the reservoir to the brake cylinder and from the brake cylinder to the atmosphere, and a train line adapted to feed air into the reservoir through the triple valve, of a safety appliance embodying means actuated by the brake cylinder pressure for preventing the escape of the triple exhaust with the triple valve slide valve in the release position, means for cutting in straight air into the brake cylinder with such holding means in the working position, and means for automatically cutting off such straight air when the brake cylinder pressure has reached a predetermined point.

12. In an air brake system, the combination with a reservoir, a brake cylinder, a triple valve arranged to control the passage of air from the reservoir to the brake cylinder and from the brake cylinder to the atmosphere, and a train line adapted to feed air into the reservoir through the triple valve, of a safety appliance embodying means actuated by brake cylinder pressure for preventing the escape of the triple exhaust with the triple valve slide valve in the release position, means actuated by the train line pressure for automatically cutting off the brake cylinder air from such first named means, means for preventing the feeding straight air into the brake cylinder, and means for feeding straight air into the brake cylinder automatically upon the equalization of brake cylinder and train line pressures.

In testimony whereof we affix our signatures in presence of two witnesses.

WALTER A. SKINNER. [L. S.]
THOMAS F. CAIN. [L. S.]

Witnesses:
Jas. L. Mc Line,
W. S. Hibbert.